UNITED STATES PATENT OFFICE.

PIERRE FRANCOIS LOUIS BIENVAUX-HIM, OF BRUSSELS, BELGIUM.

IMPROVED WATER-PROOF PREPARATION.

Specification forming part of Letters Patent No. 43,659, dated July 26, 1864.

*To all whom it may concern:*

Be it known that I, PIERRE FRANCOIS LOUIS BIENVAUX-HIM, temporarily residing at Brussels, in the Kingdom of Belgium, have invented a Hydrofuge or Water-Proof Preparation; and I do hereby declare that the following is a full, clear, and exact description of the same.

The hydrofuge or water-proof preparation, for which patents have already been granted in Belgium, France, England, and Denmark, is unquestionably superior to everything of the kind hitherto invented. It render water-proof all threaded articles, silk tissues of all shades, linens, ropes or cordage, and all other filaceous materials, such as cotton, linen, hemp, &c. It is also applicable to all descriptions of pasteboard and paper for packing, dyeing, and other uses. The most important property is that of not altering in any respect the nature of the articles to which it is applied, while at the same time it gives them suppleness and durability. Applied to the marine—and this is the chief purpose of the invention—it is calculated to render most valuable service, owing to its property of resisting the action of water. Sails and ropes to which it may be applied invariably preserve their suppleness, and can still be handled with the same facility, their weight not being augmented by moisture. The safety of a ship in dangerous circumstances often depends upon the rapidity of her maneuvers. In addition to this great advantage, the preparation causes the rigging of a ship to wear longer by preventing the corrosive action of both fresh and salt water. Employed in the manufacture of tarpaulins and of camp-tents for the use of armies, it will render the same services. For the export trade it prevents the damages resulting from the present mode of packing. Even if the ship springs a leak everything contained in sacks which have received this preparation will remain uninjured by the moisture. Not containing any deleterious substance, as has been shown by chemical analysis, it may be safely applied to sacks for corn, flour, and, in short, for all colonial produce. Employed in the pasteboard and paper trade, it is still of great value, as it renders both these articles capable of replacing oil-cloth for packing up small parcels, thereby causing a great saving to retail traders, who daily send out parcels of all sizes.

The manufacture of jute or phormium has recently made considerable progress, and its tissue, in consequence of its cheapness, advantageously replaces the coarser fabrics; but the raw material being incapable of resisting the action of the water, it cannot be used as a substitute for flax or hemp. This defect disappears when the jute is submitted to the action of the hydrofuge. Hence this tissue may render the same services as linen for certain purposes, and this manufacture will be largely increased, seeing the cheapness of the aforesaid raw material.

To obtain one thousand parts of this composition of average strength, I proceed as follows: To sixty parts of grain-oil or any other sort of drying-oil I add a sufficient quantity of the gelatinous part of sea wrack-grass to form a perfect mixture. In this mixture I dissolve, at a moderate temperature, resin of any kind, varying the quantity from thirty to forty parts, according to the quality of the resin. The mixture thus formed by these three substances I continue to heat slowly and gradually to about 50° centrigrade. During this operation of melting I slightly stir the mixture and add to it carbonate of soda, not exceeding the rate of three per cent. of the quantity of materials employed in the said mixture plus the quantity of water sufficient to raise the weight of the whole to one thousand parts, meanwhile continuing to heat the whole until a thin covering of whitish scum appears on the surface of the liquid. I dip the object to be prepared into this composition at a temperature of from 25° to 30° centigrade, and leave it therein until it becomes thoroughly impregnated. This being done, I take it out and rinse it quickly in alum-water not exceeding in strength 3° Baumé, and at a temperature of from 35° to 40° centigrade. Then I dry it and press it or hot-calender it.

The trials which have been made upon jute, flax, hemp, and other tissues, as well as upon pasteboard and paper, have been completely successful, and fully prove the advantages of the process.

What I claim is—

The hydrofuge or water-proof preparation as substantially described above.

PIERRE FRANCOIS LOUIS BIENVAUX-HIM.

In presence of—
SOLMIRE DESOR,
JEAN EVERAERT.